United States Patent [19]

Bartlett

[11] 4,178,634

[45] Dec. 11, 1979

[54] PROGRAMMABLE LOGIC CONTROLLER

[75] Inventor: Peter G. Bartlett, Davenport, Iowa

[73] Assignee: Automation Systems Inc., Eldridge, Iowa

[21] Appl. No.: 814,836

[22] Filed: Jul. 11, 1977

[51] Int. Cl.² ............................ G06F 3/04; G06F 9/06
[52] U.S. Cl. ................................................ 364/900
[58] Field of Search ............... 364/200 MS File, 107, 364/900 MS File

[56] References Cited

U.S. PATENT DOCUMENTS

| | | | |
|---|---|---|---|
| 3,827,030 | 7/1974 | Seipp | 364/900 |
| 3,881,172 | 4/1975 | Bartlett et al. | 364/200 |
| 3,944,984 | 3/1976 | Morley et al. | 364/900 |
| 3,959,634 | 5/1976 | Johnson et al. | 364/107 |
| 3,997,879 | 12/1976 | Markley et al. | 364/900 |
| 4,006,464 | 1/1977 | Landell | 364/900 |
| 4,045,660 | 8/1977 | Weisgerber | 364/107 |
| 4,107,785 | 8/1979 | Seipp | 364/900 |

*Primary Examiner*—Harvey E. Springborn
*Attorney, Agent, or Firm*—Woodard, Weikart, Emhardt & Naughton

[57] ABSTRACT

A programmable logic controller includes a plurality of input interfaces and a plurality of output interfaces for connection to industrial equipment such as automatic assembly equipment, textile machinery, materials handling equipment, and chemical processes. The input and output circuits can be randomly addressed as to their state through an eight bit bus, which connects in parallel with up to 16 groups of eight input and/output circuits. The controller includes groups of timers which are each manually adjustable as to the timing operation and which are sequentially addressed each time a timing function is called for by the program. The timers are designed to be cascaded in groups to virtually any number of timers. The controller includes a scratch pad memory, half of which retains memory upon power failure and half of which does not. The control of the controller by the operator is made more nearly foolproof by interlocking the operations of control switches. Three programming instructions are available which are conditional upon the data in the accumulator of the controller.

19 Claims, 11 Drawing Figures

PROGRAMMABLE LOGIC CONTROLLER

BACKGROUND OF THE INVENTION

1. Field of the Invention

The present invention relates to the art of controllers for mechanical systems requiring logic processing of input data and more particularly to a programmable logic controller such as is classified in class 364 subclass 900 and class 364/200, 02 file.

The invention is particularly related to a programmable controller equipment associated with a transfer line or to control a machine tool or other mechanical system of the type generally, in the prior art, controlled by a relay logic system.

2. Description of the Prior Art

One example of the prior art is U.S. Pat. No. 3,827,030 to Seipp. The Seipp reference discloses a programmable logic controller which incorporates, in addition to the normal input and output interface circuits, a supplemental random access memory for storing data used in calculating. Logic signals to and from the input and output interface circuits travel on separate one bit data buses. The data processed by the controller and retained in the random access memory is not significantly affected by power interruptions since a separate battery is incorporated into this circuit to maintain a holding voltage on the random access memory during such times as when the equipment is turned off or power is otherwise interrupted to the controller. While there are desirable aspects to a permanent memory, there are other desirable features of a nonpermanent memory for the temporary storage of data. Oftentimes the need arises to readily erase the data in a permanent memory and this can be difficult to accomplish with conventional controllers such as is set forth in Seipp.

In column 15 of U.S. Pat. No. 3,944,984 to Morley et al. reference is made to latch circuits which allow designated outputs to have retentive memory in case of power failure. While this is a desirable feature, programming of the device is made difficult by the dedication of the specific inputs and outputs to the latching functions when it may actually be that the data which is desired to be latched in the event of power failure does not need to interface to any equipment without further processing. Moreover, the resetting of the otherwise permanent memory found in certain prior art controllers is generally either so easy to do that it can be accomplished by accident or so difficult to do that substantial time is devoted to what should otherwise be a simple straightforward procedure.

In general, prior art controllers do not have associated with them switches and displays which make it easy for an operator to follow the functioning of the programmable controller and to determine where errors may exist in programs. Typically, prior art controllers require complex programming devices to be associated with them for the purpose of programming the read only memory generally used to store the program for the controller. For the most part, programmable logic controllers of the prior art do not have a display for displaying the state of the accumulator or the state of an accessed data bit nor do the devices have manual controls which are simple to operate in a manual mode or in a mode in which the outputs are disabled.

U.S. Pat. No. 4,006,464 to Landell discloses an industrial process sequence controller which digitally displays the sequence step. This patent also discloses a switch for disconnecting load terminals from attached loads thereby disabling the outputs and another switch for causing the sequence steps to be sequenced manually. However, this disclosure sets forth no means of protection which would preclude the energization of the loads when the unit is placed in the manual or set-up mode. This would permit inadvertent operation of the equipment in a fashion which could severely damage the equipment to which the controller is attached. The sequence controller of Landell does not incorporate a large programmable read only memory which is scanned at a high rate of speed as in prior art programmable logic controllers, and therefor it does not present the same programming difficulties of prior art programmable logic controllers.

Typically, programmable logic controllers of the prior art, such as U.S. Pat. No. 3,827,030 to Seipp, transferred data to the interface devices on a single bit data bus. Some prior art equipment incorporated a single bit data bus for transmitting data to the interface devices and a second single bit data bus for transmitting data back from the interface devices.

U.S. Pat. No. 3,881,172 to Bartlett et al. discloses a single bit data bus which is bidirectional and is used for both inputs and outputs.

U.S. Pat. No. 3,997,879 to Markley et al incorporates a complex data transfer system. An eight conductor data bus is used for transmitting data in parallel form to the interface devices. A second eight bit data but is used to transmit data from the interface devices back to the processing equipment. Very complex and expensive equipment is required in the disclosed circuitry to handle the two eight bit data buses.

U.S. Pat. No. 3,827,030 to Seipp discloses a conditional instruction referred to as a "store Seipp function". This is used to allow the skipping of program statements prior to the next store instruction conditioned upon the state of the accumulator output. While this is a useful feature, certain programming needs make the use of this feature rather awkward. Occassionally, it is useful to be able to return to the beginning of the series of program statements with a single instruction rather than to have to use a sequence of skipping instructions to skip groups of operations between sequential store operations.

One function typically required to be performed either by a programmable logic controller or equipment associated with it is a timing function. Some programmable logic controllers incorporate complex timing circuits which can be numerically controlled by data programmed into the controller. Where read only program memories are used, this makes a change of the timing intervals difficult. In any event, the incorporation of this feature substantially increases the requirement for data storage by the data controller. Various attempts to incorporate timers into programmable controllers have generally resulted in very expensive equipment operating in a complex fashion. As an alternative to incorporating timers within the unit, timers can be connected to individual input and output circuits. Not only does this use up various address locations which thereby reduces the number of address locations available for normal input and output functions, but additionally (unless the circuit is otherwise specially designed), this uses expensive input and output interface circuitry for accomplishing the timing function.

Prior art controllers, such as disclosed in Seipp, require substantial decoding circuitry to convert the programmed data to operating instructions and to thereafter operate upon addressed data. This circuitry adds to the cost of the equipment, increases its size and reduces reliability. Similarly, machine instruction decoding has been complicated in prior art controllers, with similar effects.

SUMMARY OF THE INVENTION

The invention relates to a programmable logic controller incorporating numerous improved features. While the actual natures of the inventions covered herein can be determined only by reference to the claims appended hereto, certain of the features which are relevant to the improved operation of the novel programmable controller disclosed herein can be described briefly. The circuitry disclosed incorporates a multi-bit data bus which connects to groups of input and output circuits, each group being located on an individual printed circuit card fitting into identical printed circuit card edge connectors. The multi-bit bus functions to transmit data both to and from the interface circuits in a bi-directional fashion. This technique substantially reduces the interconnection wiring and simplifies the construction of programmable logic controllers having a large number of inputs and outputs. The controller uses a technique for changing data in the output circuits which (1) reads the presently stored data bits on a group of outputs, (2) determines if any one bit in that group of bits should be changed and if so (3) changes that one bit and causes the revised data to be latched into the output circuit latches.

Another feature of the invention is the fact that it has a scratch pad memory for the temporary storage of data which is divided into two separate sections one of which is completely reset when power is turned on and the other of which is normally maintained in its programmed state regardless of power failure. Moreover, the retentive portion of the scratch pad memory can only be reset by the actuation of a reset button when the power to the unit is "off." Actuation of the reset button when power is "on" has no effect upon resetting of the retentive half of the scratch pad memory.

Another feature of the invention is the incorporation of a three position switch to select among (1) normal running of the unit with outputs enabled, (2) normal running of the unit with outputs disabled, and (3) single step operation of the unit with outputs disabled. Associated with the three position switch is a push button which when activated while the unit is in the single step mode causes individual clock pulses to be generated. Additionally a switch is included for resetting the counter to the initial count so that the manual sequencing can begin at the beginning of the program. The switches are connected in a fashion to preclude dangerous operation of the programmable logic controller and to preclude their functioning at a time when the functioning would not be appropriate.

Still another feature of the invention is the machine instructions which are conditional upon data in the accumulator. These include the set data inhibit/enable instruction which will cause all subsequent store instructions to store zero if the accumulator output is 1. Another machine instruction that it conditional upon the accumulator output is the set store inhibit/enable instruction which will cause all subsequent store instructions to be inhibited if the output of the accumulator is 1. A third conditional instruction is the conditional end of scan which causes the scanning of the programm to be reset to the initial set of the program if the accumulator is 1. These features are all simply incorporated with a straightforward logic circuit in an inexpensive fashion and are powerful programming techniques for accomplishing the results for which programmable logic controllers are normally used.

Still another feature of the invention is the incorporation of serial mode timers which can be cascaded to virtually any number of timers and which operate without any address code being required. The timers are each manually externally adjustable, or optionally remotely adjustable, as to the length of time for which the timing function occurs. They are selected in the order of the sequence of the timing instructions in the program which is controlling the operation of the logic controller. The delegation of address codes solely to the input and output locations and the scratch pad locations while reserving a sequential access to the timers results in highly efficient use of the limited memory which one can obtain for a low cost. Moreover, should there be a need to address any specific timer or groups of timers in other than the sequential fashion inherent in the machine, the outputs of the timers can be stored in the scratch pad memory either in the retentive portion or non-retentive portion and later addressed at any time as desired.

The above features of the invention together with those which will become apparent from the description of the preferred embodiment combine to make the disclosed preferred embodiment a very inexpensive, highly functional programmable logic controller which is quite small in size and yet performs functions equal to or more powerful than programmable logic controllers of the prior art which are more complex and much more expensive as well as being larger in size.

DESCRIPTION OF THE PREFERRED EMBODIMENT

Figure 1:
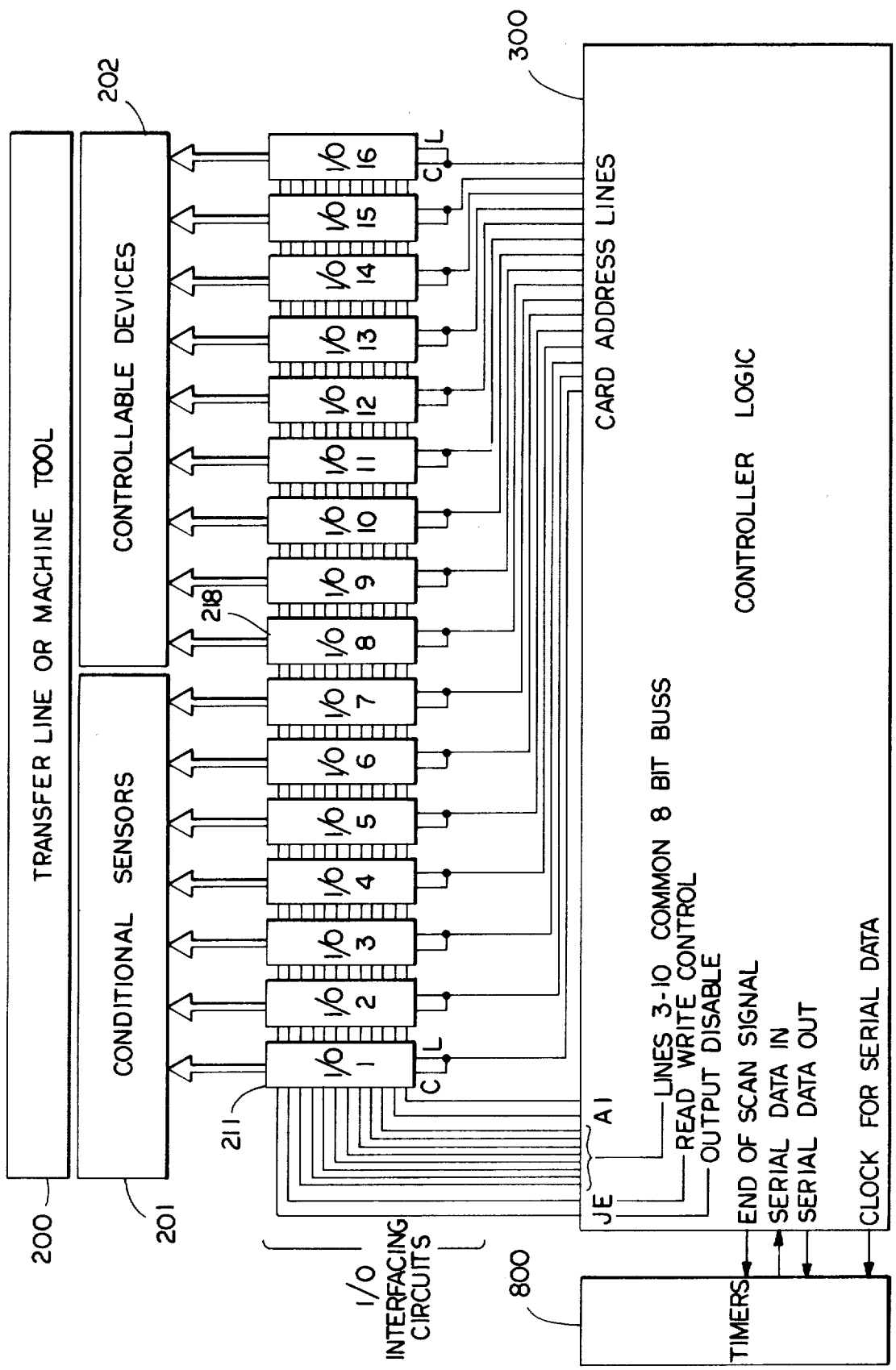
FIG. 1 is a block diagram depicting the connection of the programmable logic controller of the invention to conditional sensors and controllable devices associated with the equipment to be controlled by the programmable controller.
Figure 2:
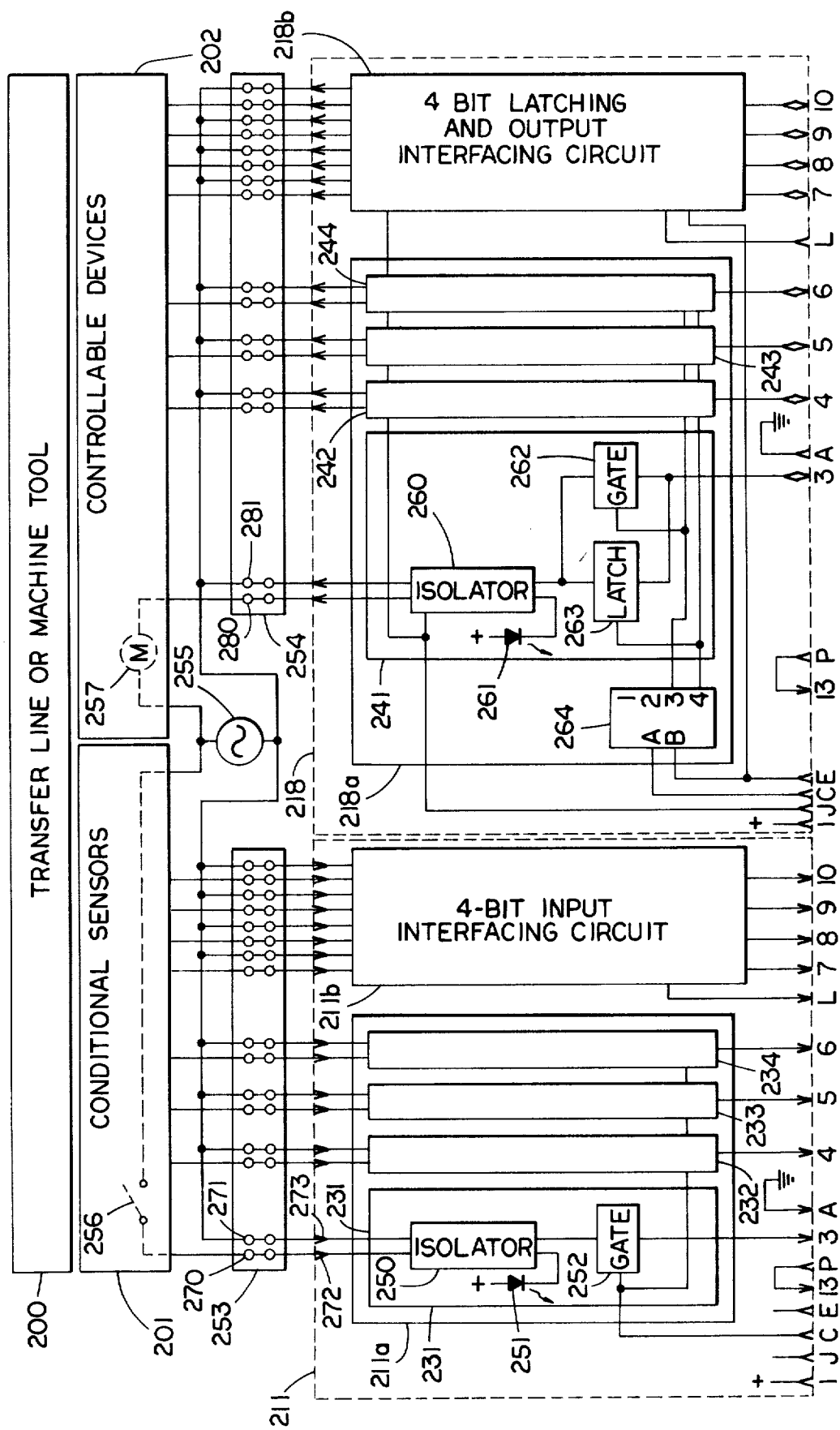
FIG. 2 is a block diagram depicting an input and an output interface circuit of FIG. 1 as they connect to the conditional sensors and controllable devices associated with the controlled equipment.

Referring in particular to FIG. 1 there is illustrated in block diagram form the preferred embodiment of the programmable logic controller of the invention. The controller is adapted to control equipment associated with a transfer line or a machine tool 200. The controller could equally well be used for controlling other mechanical systems of the type generally controlled by a relay logic system. Associated with the equipment are conditional sensors 201 which may be limit switches, relay contacts, push buttons, etc. These are schematically represented as switch 256 as shown in FIG. 2. The controllable devices 202 associated with the transfer line or machine tool 200 may be motors, motor starters, indicator lights, relay coils, etc. Motor 257 of FIG. 2 is a typical controllable device and is shown as merely an example of one of the controllable devices 202.

Since the conditional sensors 201 and the controllable devices 202 normally operate at voltages and currents different from those used by typical logic circuitry, and since isolation among individual inputs and outputs is desirable, the programmable logic controller of the invention incorporates I/O interfacing circuits I/O 1 through I/O 16. While FIG. 1 discloses I/O 1 through I/O 7 as connecting to conditional sensors 201 and I/O 8 through 16 as connecting to controllable devices 202, the equipment is adapted so that any desired arrangement of inputs and outputs can be achieved by the insertion of appropriate input or output interface cards in the various I/O positions. I/O 1 is typical of I/O 1–7 and contains an input printed circuit card 211 with the capacity to handle eight input circuits. I/O 8 is typical of I/O 8 through I/O 16 and contains within it an output printed circuit card 218 which is capable of handling eight output circuits. It can be observed then that the preferred embodiment as shown in FIG. 1 is set up to handle 56 inputs and 72 outputs.

Figure 3:
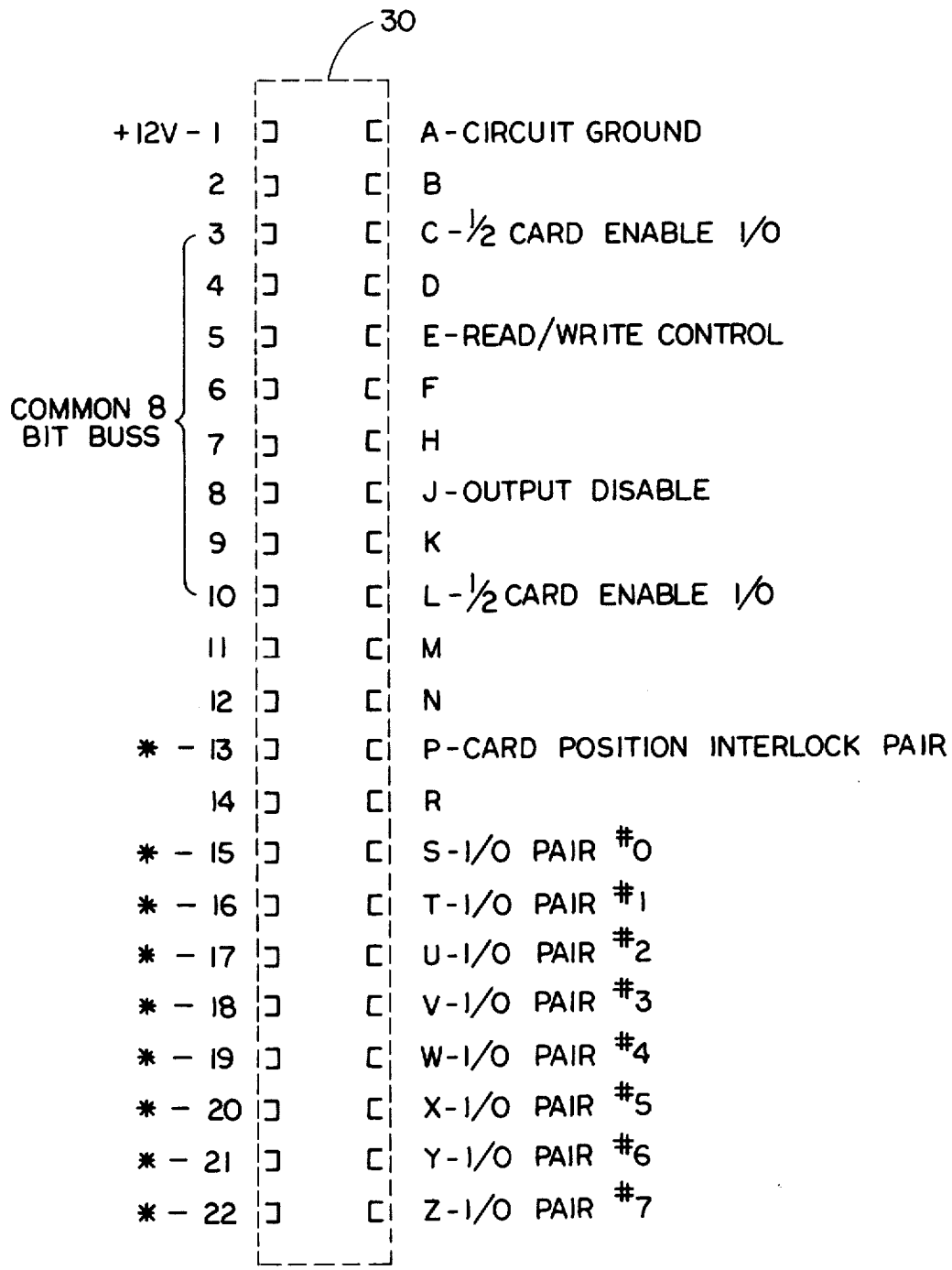
FIG. 3 is a diagram of a printed circuit card edge connector into which input or output interfacing circuit cards such as in FIG. 2 are inserted.

A group of twelve lines (J, E, lines 3–10, A, and 1) connect the controller logic 300 to each of the I/O interfacing circuits. These lines connect to a printed circuit card edge connector 30 as shown in FIG. 3 associated with each of the I/O interfacing circuits. The input circuit card 211 is inserted into a connector 30 for I/O 1 and the output circuit card 218 is inserted into an identical printed circuit card edge connector 30 associated with I/O 8. By simply inserting the desired printed circuit card into the printed circuit card edge connector associated with each of the 16 I/O positions, one can then accomplish apportionment of input and output circuits in various different combinations. As shown in FIG. 1, timers 800 connect directly to the controller logic in a simple fashion and do not require the use of the I/O interfacing circuits nor the address lines associated with those circuits. It can be observed from FIG. 1 that each individual interfacing circuit is separately addressed from the controller logic through the card address lines which connect to terminals C and L on connector 30, one of which is associated with each of the I/O interfacing circuits. Data to and from the interfacing circuits is transmitted bidirectionally on the common eight bit bus which includes lines 3–10 and operates in association with whichever of the I/O interfacing circuits is addressed by the card address lines.

Referring more particularly to FIG. 2 there are illustrated input circuit card 211 and output circuit card 218. Input circuit card 211 has along one edge (shown along two edges for purposes of illustration) printed circuit card edge connecting portions such as 272 and 273 which extend nearly to the edge of the printed circuit card and make contact with the contacts 1, 3–10, 13, 15–22, A, C, E, J, L, P, and S–Z of printed circuit card edge connector 30. The function of each edge portion is set forth in FIG. 3. As an interlocking feature, the edge connection portions associated with contacts 13 and P do not extend as close to the edge as do the remaining edge connecting portions. These connections are used for interlocking the circuits so that as a card is removed this connection breaks first and power to the programmable controller can be turned off before other connections are affected. The terminals of the printed circuit card edge connector 30 are wired to a terminal strip 253 where ready connection can be made by terminals 270 and 271 to external conditional sensors such as switch 256 which is shown connected in series with a 110 volt AC source 255.

The input circuit card 211 includes two 4-bit input interfacing circuits 211a and 211b which are identical in construction. 4-bit interfacing circuit 211a includes four input bit handling circuits 231–234 which are identical in construction. Input bit handling circuit 231 includes an isolator circuit 250 which is as described in U.S. patent application Ser. No. 707,630, filed July 22, 1976 by Peter G. Bartlett, now U.S. Pat. No. 4,063,121. In addition to the circuit disclosed in this patent, the isolator 250 includes a drive circuit for driving a light emitting diode 251 which indicates the state of the input switch. A gate 252, which is preferably a Motorola MC14016 CMOS device, is used to control whether or not the output of the isolator 250 is applied to line 3 of the common eight bit bus.

Output circuit card 218 includes two identical 4-bit latching and output interfacing circuits 218a and 218b. 4-bit latching and output interfacing circuit 218a includes four identical output bit handling circuits 241–244 each of which can control 110 V.A.C. output circuits carrying 2 amperes. Output bit circuit 241 includes an isolator 260 which incorporates circuitry such as is shown in U.S. patent application Ser. No. 703,398 filed July 8, 1976 by Peter G. Bartlett, now U.S. Pat. No. 4,055,793. It additionally includes a drive amplifier for driving a light emitting diode 261 which indicates the state of the output. A signal from J connects to the isolator for disabling the output of the isolator notwithstanding the input signal and the indication of the LED 261 as to the otherwise effective output signal condition.

The input to the isolator is determined by the output of latch circuit 263. When enabled by the output 4 of two bit decoder 264 the output of the latch circuit 263 assumes the state of the input of the latch circuit. The input of the latch circuit connects to line 3 of the eight bit common bus. Line 4 is energized when the output circuit card 218 is enabled through line C and the write command is received through read/write (R/W) line E. If no write command is received, but the card is enabled through line C, then output 3 of decoder 264 is energized which thereby allows transmission gate 262 to place the condition of latch 263 onto line 3 of the eight bit common bus. It can be seen, therefore, that line 3 of the eight bit common bus connects both to the input circuit cards and to the output circuit cards and is used for transmitting data both to and from circuit cards associated with the programmable logic controller. It can also be observed that a card containing both input and output circuits (such as 4+4) could be used in an I/O position.

Figure 4:
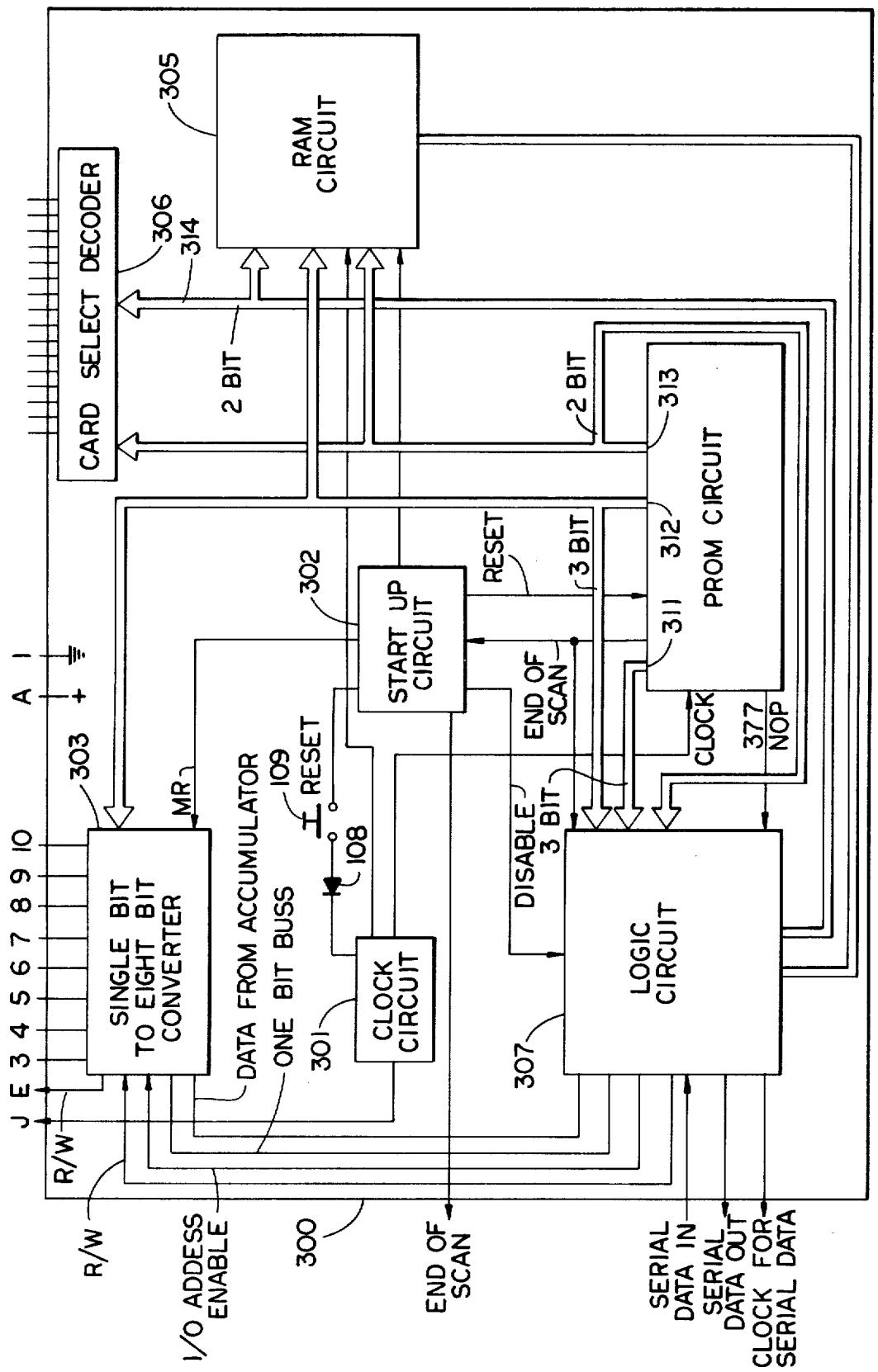
FIG. 4 is a block diagram illustrating the controller logic of FIG. 1.
Figure 5:
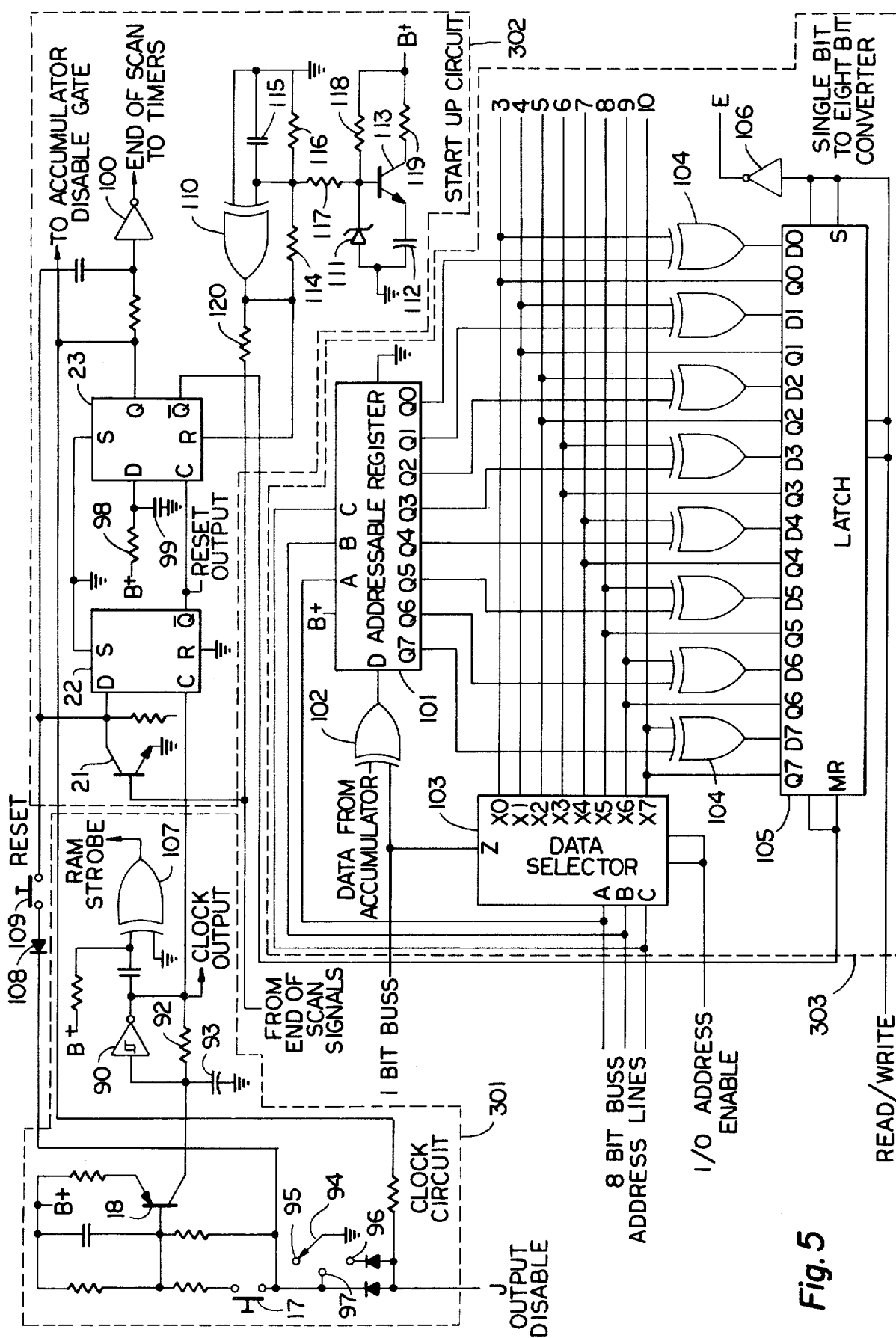
FIG. 5 is a circuit diagram of a portion of FIG. 4 and includes the single bit to eight bit converter, the clock circuit, and the start-up circuit of FIG. 4.

Referring more particularly to FIG. 4 there is illustrated in block diagram form the controller logic 300 of FIG. 1. The actual circuit diagrams of controller logic 300 are contained in FIGS. 5, 6 and 7. Referring more particularly to FIG. 5 there is illustrated the clock circuit 301 which controls the mode of operation and the rate at which the programmable logic controller functions.

There is illustrated a three position switch 94 for controlling the mode of operation. When connected to contact 95, the clock is permitted to free-run but when connected to position 97, transistor 18 is caused to conduct thereby clamping the voltage on the input of Schmitt trigger 90. Schmitt trigger 90 normally oscillates by the action of charging and discharging capacitor 93 through resistor 92, but when transistor 18 is turned on, discharge of capacitor 93 is precluded. The third position for switch 94 occurs when it is connected to contact 96. This third position provides a ground reference to the output disable line J. When the switch is connected to either contacts 96 or 97, the output disable line J is energized and all outputs of the controller are rendered inoperative.

When switch 94 is connected to contact 97, a single clock pulse can be generated by the momentary closure of push button switch 17. At any other position of switch 94, push button 17 has no effect. By repeatedly operating switch 17 when switch 94 is connected to contact 97, repeated clock pulses can be generated to allow observation of the action of the programmable controller. Since the input and output indicating diodes (such as diodes 251 and 261 of FIG. 2) remain operative when the outputs are disabled, trouble shooting of the program is made simplier. Gate 107 provides a clock pulse to the RAM strobe circuit. Push button reset switch 109 connects through diode 108 to contact 97 of switch 94. Since reset switch 109 is only needed when manual operation of the clock is desired, it is connected in series with switch 94 to only provide the ground signal needed for the reset function when the switch 94 is set to the manual mode. This prevents inadvertent and possibly dangerous resetting of the PROM 20 program scanning sequence during normal operations.

Start-up circuit 302 incorporates circuitry to sense the presence of eight volts of B+. When power is applied, transistor 113 is caused to conduct and charge capacitor 112 through resistor 119. Capacitor 112 will eventually charge to the voltage level of operation of zener diode 111 which receives current through resistor 118 (less the voltage drop of the base emitter junction of transistor 113). These components then affect the operation of exclusive or gate 110 by coupling through resistor 117 to the parallel combination of capacitor 115 and resistor 116 and the feedback resistor 114. The exclusive or gate 110 controls the state of transistor 21 and initially maintains flip-flop 23 in a reset condition. With the output of transistor 21 initially low, the $\overline{Q}$ output goes high thereby presenting a reset signal to various portions of the programmable logic controller. Since the reset input of flip-flop 23 is high the $\overline{Q}$ output of flip-flop 23 is low, thereby disabling all outputs and disabling the output of the accumulator. (Note the coupling through the clock circuit 301 to the output disable line J.) The $\overline{Q}$ output of flip-flop 23 connects to the master reset MR of latch 105 causing all outputs to be reset. The data input of flip-flop 23 is supplied through resistor 98 and filtered by capacitor 99. After the supply voltage has reached its requisite level, the output of exclusive or gate 110 goes low allowing the next subsequent clock pulse to operate flip-flop 23 to reverse the state of its outputs, thereafter allowing normal operation of the programmable logic controller.

The effect of the start-up circuit 302 is to cause one complete cycle of reading of the program instructions to occur before the actual effective operation of the programmable controller begins. During this initial cycle, all of the output interface circuits which are addressed for storage by the program are latched off and the non-retentive portion of the RAM storage (scratch pad) locations which are addressed for storage are reset.

Figure 6:
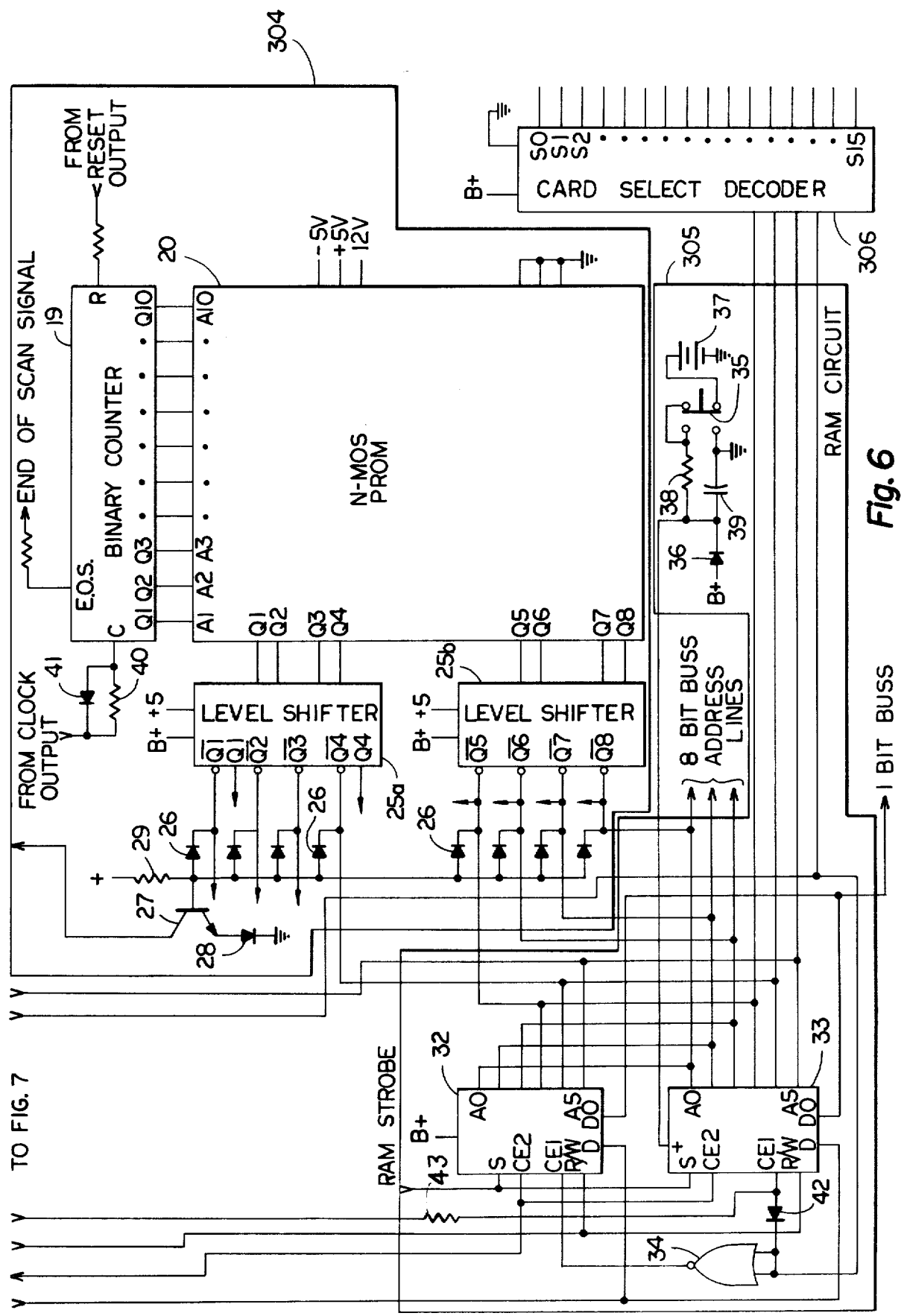
FIG. 6 is a circuit diagram of a portion of FIG. 4 and includes the PROM circuit, the RAM circuit and the card select decoder of FIG. 4.

Referring more particularly to FIG. 6 there is illustrated a binary counter 19 (Fairchild CMOS type 4040) which receives through resistor 40 and diode 41 a clock pulse from the clock output of clock circuit 301. Binary counter 19 counts to a full count on 10 binary output lines and then produces an end of scan signal at its terminal E.O.S. which feeds back to the base of transistor 21. This produces a reset output signal at the $\overline{Q}$ output of flip-flop 22 at the next clock output. This reset output resets binary counter 19 by the action through the reset input R of binary counter 19. This binary counter 19 then begins to count again until a full count is reached and the process repeats itself. The output of the binary counter 19 functions to step the N-MOS PROM 20 through 1,024 words of memory, each word containing eight bits. The memory is an Intel light erasable reprogrammable memory manufactured by the Intel Corporation of Santa Clara, California (part no. 2708). The nature of this product as used in programmable logic controllers is set forth in U.S. Pat. No. 3,944,984 to Morley et al. To convert from the N-MOS circuit of the PROM to the C-MOS circuitry of the remainder of the controller, two level shifters 25a and 25b are used (Fairchild CMOS type 4104).

Figure 7:
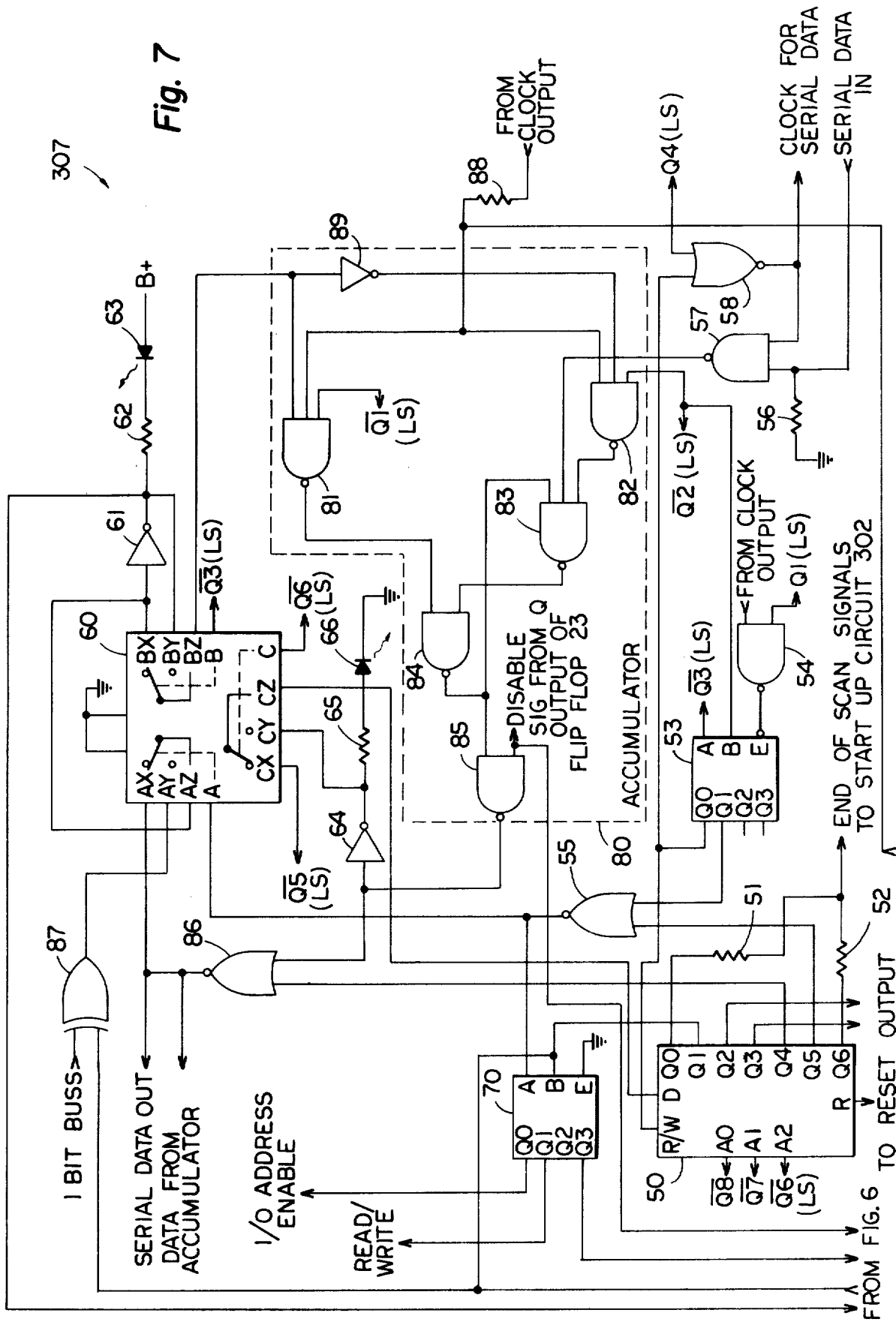
FIG. 7 is a circuit diagram of a portion of FIG. 4 which includes the logic circuit of FIG. 4.

A group of eight diodes 26 are connected to the inverted outputs of the level shifters 25a and 25b to produce a signal at the base of transistor 27, in conjunction with resistor 29 and diode 28, to indicate that all of the bits in a particular word being read are a logic 1. The programming of all bits to a logic 1 can be accomplished anytime an error in programming the PROM is made simply by programming any remaining logic 0's to logic 1's. The resultant activation of transistor 27 in this condition is used to signify that no operation of the controller is desired (NOP). This procedure essentially erases errors. Transistor 27, by connection to the clock input of accumulator 80 as shown in FIG. 7, prevents the operation of the accumulator during the time a fully programmed word (all bits are 1) is being read from the PROM 20.

The individual I/O units I/O 1 through I/O 16 are selected through card address lines which are generated by card select decoder 306. Decoder 306 has sixteen outputs lines S0 through S15 which are selected according to the binary count on the input lines. As can be observed from FIG. 6, two of the input lines connect to the $\overline{Q4}$ and $\overline{Q5}$ outputs of level shifters 25a and 25b (LS). The remaining two lines are generated from latches controlled by machine language instructions. This has the effect of dividing the I/O locations into four sections as will later be described with reference to FIG. 8.

This type of division of access to I/O locations or scratch pad locations is similar to the "units" and "pages" sectioning of memory disclosed in U.S. Pat. No. 3,827,030. Lines in the common eight bit data bus are addressed by the outputs from the $\overline{Q6}$, $\overline{Q7}$ and $\overline{Q8}$ outputs of level shifter 25b. It can therefore be observed that five of the eight bits of each word are used generally for address purposes. The remaining three bits present at the $\overline{Q1}$, $\overline{Q2}$ and $\overline{Q3}$ outputs of level shifter 25a are used generally for operating instructions. These instructions are as set forth in Table 1:

TABLE 1
LOGIC INSTRUCTIONS
(Outputs #4–8 functioning as address codes)

| OUTPUT # 3 2 1 | NAME | FUNCTION | OCTAL VALUE OF OPERATING BITS |
|---|---|---|---|
| 0 0 0 | Machine | To select appropriate machine instruction in accordance with PROM address bits. (See Table 2) | 0 |
| 0 0 1 | OR | Or ACC (accumulator) with data from I/O or scratch pad memory at a position corresponding to PROM address bits (Outputs #4–8) and machine selected location, side and tier. Store answer in ACC. | 1 |
| 0 1 0 | AND | And ACC with data similarly selected from I/O or scratch pad memory. Store answer in ACC. | 2 |
| 0 1 1 | LOAD | Load ACC with data similarly selected from I/O or scratch pad memory. | 3 |
| 1 0 0 | STORE | Store ACC data in similarly selected I/O or scratch pad memory location. | 4 |
| 1 0 1 | ORC | Or ACC with complement of data similarly selected from I/O or scratch pad memory. Store answer in ACC. | 5 |
| 1 1 0 | ANDC | And ACC with complement of data similarly selected from I/O or scratch pad memory. Store answer in ACC. | 6 |
| 1 1 1 | LOADC | Load ACC with complement of data similary selected from I/O or scratch pad memory unless all address bits are 1, then no operation (NOP). | 7 |

It can be observed that with all of the instructions except the first, an address location is logically relevant to the instruction. However, with the first instruction, there is no associated address code relevant to the machine language function. In view of this, the address bits can be used to select from among a large number of machine language operations (potentially 32). The various machine language operations which are operable with the disclosed circuit are as follows:

TABLE 2
MACHINE INSTRUCTIONS
(Outputs #1, 2 and 3 all 0)

| OUTPUT # 4 5 6 7 8 | NAME | MACHINE INSTRUCTIONS | OCTAL VALUE OF ADDRESS BITS |
|---|---|---|---|
| 0 0 0 0 0 | NOP | No operation. | 00 |
| 0 0 0 0 1 | IOE | I/O location enable. | 01 |
| 0 0 0 1 0 | ALD | Address jump to low order decades (1st tier of side) X00 to X37 | 02 |
| 0 0 0 1 1 | AUH | Address jump to under 100 (lower side of location) 0XX | 03 |
| 0 0 1 0 0 | ADI | Set data inhibit/enable from ACC (if ACC is a one, all subsequent store instructions will store zero). | 04 |
| 0 0 1 0 1 | SSI | Set store inhibit/enable from ACC (if ACC is one, all subsequent store instructions will be inhibited). | 05 |
| 0 0 1 1 0 | CEOS | Conditional end of scan (if ACC is one, reset memory scanner to zero). | 06 |
| 0 1 0 0 0 | EOS | End of scan. Reset the memory scanner to zero so that time is not wasted scanning unprogrammed memory. | 10 |
| 0 1 0 0 1 | SPE | Scratch pad location enable. | 11 |
| 0 1 0 1 0 | AHD | Address jump to high order decades (2nd tier of side) X40 to X77. | 12 |
| 0 1 0 1 1 | AOH | Address jump to at least 100 (upper side of location) 1XX. | 13 |
| 1 0 0 0 0 | SIO | Serial I/O active. (Serial input/output for special functions such as timers, remote I/O, or computers.) | 20 |

Referring to FIG. 6, there is illustrated a RAM circuit 305 which contains the scratch pad memory. The scratch pad memory includes RAMs (random access memories) 32 and 33 (Motorola CMOS 4505). RAM 32 operates from the supply B+ voltage and therefore loses its memory when power is momentarily interrupted or when the controller is turned off. Upon restoration of power, start-up circuit 302, as previously described, resets all storage locations of RAM 32 which are addressed for storage by the program instructions of PROM 20. In contrast, RAM 33 is not only supplied during normal operations through diode 36 with a B+ supply voltage but in addition when supply voltage is removed, a battery 37 supplies the appropriate voltage for continued operation through the normally closed contacts of switch 35, resistor 38. A capacitor 39 is used to filter the supply voltage supplying RAM 33. It can be noted that when power supply is off and switch 35 is actuated, the supply voltage is removed from RAM 33 and is replaced by ground potential which eventually drains capacitor 39 through resistor 38. RAM 33 has the property of having all data bits high when power is restored. Since subsequent logic operations invert this logic, the effect is to have all data positions reset upon operation of the reset button 35 when power is off. When power is on, operation of reset button has no effect since only the voltage drop of diode 39 presents itself between the supply voltage and the RAM 33. The presence of resistor 38 prevents the shorting to ground of supply voltage applied to RAM 33 if switch 35 should be inadvertently actuated and provides a trickle charge to battery 37 to maintain its charge. It can be seen that the reset button functions only when power is off, thereby preventing an inadvertent erasure of data in RAM 33 during normal operation of the equipment. Nonetheless, the resetting of all data to zero in RAM 33 can very easily be accomplished simply by turning off the programmable logic controller and actuating the reset button 35.

While battery 37 maintains a power supply for RAM 33, the normal operation described for start-up circuit 302 is to cause one complete cycle of reading of the program instructions to occur during which time addressed storage location are reset. To prevent this from happening to the retentive half of the scratch pad memory the same signal which causes the accumulator output to be disabled connects through resistor 43 to disable the operation of RAM 33. Isolating diode 42 prevents the low signal on the CE1 input of circuit 33 from affecting the input to the inverting amplifier 34. Inverting amplifier 34 normally functions to select either RAM 32 or RAM 33 when the scratch pad memory is otherwise enabled through the input at CE2 of the respective RAMs.

Referring more particularly to FIG. 5 there is illustrated a single bit to eight bit converter 303. This circuit controls the data on the common eight bit bus which connects to all of the interface circuits. In the normal read mode the data selector 103 (Motorola CMOS 4512) is enabled by the I/O address enable line. The binary data from the eight bit bus address lines connecting to A, B and C are decoded and enable one of the inputs XO through X7 to transmit data to the data output Z. This output is then applied to the one bit bus for operation by the logic circuit 307. It can be observed for any card selection of the card select decoder 306, eight bits of data will be present on the lines 3-10 of the eight bit bus. When the unit is in the read mode, these bits will correspond to the states of the inputs or outputs of the I/O interfacing circuits of the addressed card.

When data at a particular location is to be changed, the output of exclusive or gate 102 is significant. If the data in the output location is the same as the data to be stored, then the output of the data selector 103 will be the same as the output of the accumulator which connects to an input of the exclusive or gate 102.) In this event, the output of the exclusive or gate 102 will be a logic zero. If the data selector output is different from the data from the accumulator then this difference will be detected by exclusive or gate 102 and a logic 1 will be produced at the data input of the addressable register 101. Since the addressable register is addressed by the same address lines addressing the data selector the logic signal at the output of exclusive or gate 102 will be present at the addressed output of the addressable register corresponding to the line addressed by the data selector. For example, if line 7 were selected through input X4 of data selector 103, the addressable register would place the output from exclusive or gate 102 at Q4 of addressable register 101. If a difference is detected, then exclusive or gate 104 will have a logic 1 at one of its inputs. It is the property or exclusive or gates to invert the data in one of its inputs when its other input is at a logic 1 and to not invert data when at a logic zero. The effect of this action is to produce at the data inputs D0–D7 of latch 105 the data on the eight bit bus except that the single addressed bit which needs to be inverted, if any, is inverted in the latch 105. When the write command is received, latch 105 produces at its output Q0–Q7 the revised eight bit data and inverting amplifier 106 applies a write signal to the output circuits to cause the latches in the eight output circuits of the addressed card to assume the status of the new group of eight bits on the common eight bit bus. (Latch circuit 105 may be Motorola CMOS 4508, exclusive or gates 104 may be Motorola CMOS 4070 and addressable register 101 may be Motorola CMOS 4099.)

Referring in particular to FIG. 7 there is illustrated the logic circuit 307 of FIG. 4. In analysing the logic circuit it should be kept in mind that the PROM 20 has all outputs high if it is not programmed. The inverting feature of level shifters 25a and 25b produce the more conventional normally low outputs for an unprogrammed state at their inverted outputs. The basic data handling of the logic circuit 307 is accomplished by the accumulator 80. The accumulator 80 has a nand gate 85 which provides for disabling of the output of the accumulator during the initial cycle through the PROM after the unit has been turned on as has been previously discussed. The output of the accumulator 80 is determined principally by the combination of nand gates 83 and 84 which are connected together to form a flip-flop circuit. The equivalent Q output of the flip-flop appears at the output of nand gate 84 and the equivalent of $\overline{Q}$ output appears at the output of nand gate 83. The output of nand gate 81 produces the set signal for the flip-flop circuit and the output of nand gate 82 produces the reset signal for the flip-flop. The actual set and reset are inverted in polarity in that the set function is accomplished by the output of nand gate 81 going low and the reset function is accomplished by the output of nand gate 32 going low.

The clock provides an input to the accumulator through resistor 88 by connecting to inputs of nand gates 81 and 82. This connection allows the flip-flop circuit to change states only during a clock cycle. It can be noted that nand gates 81 and 82 have inputs corresponding to Q1 and Q2 of the PROM. The remaining two inputs on nand gates 81 and 82 contain normal and inverted data, the inverted data being provided by inverter amplifier 89. As can be observed from the accumulator diagram, the and/or and load functions are all accomplished simply by the direct application of the Q1 and Q2 complement signals to the accumulator. For the store and machine functions, both the Q1 and Q2 corresponding inputs to the nand gate will be low and therefore the accumulator will not change state.

It is believed that the simple relationship of the and, or and load function to an accumulator state has not been previously appreciated. Where the accumulator is an R/S or J/K flip-flop, or equivalent, the "and" instruction means that you can only reset the accumulator flip-flop if data is "0". The "or" instruction means that you can only set the accumulator flip-flop if data is "1". The "load" instruction means that you set the accumulator flip-flop if the data is "1" and reset the accumulator if the data is "0". This previously unappreciated simple relationship allows direct control of the accumulator by the stored instruction bits without decoding, providing the instruction bits are appropriately designated and arranged.

The logic functions of the accumulator which involve the complements of the addressed data are achieved by direct connection of the $\overline{Q3}$ output of the level shifter to the B input of circuit 60. Circuit 60 is a Motorola CMOS MC14053 analog demultiplexer which functions equivalent to a relay as connected and shown in the drawings. The signal at input B causes the line connecting to Bz to connect either to the line connecting to Bx or the line connecting to By. Since inverting amplifier 62 is positioned between the two inputs and since the data addressed appears at input Bx of circuit 60 the data to the accumulator is either normal or inverted depending upon the state of Q3. A resistor 62 and light emitting diode 63 serve to provide visual indication of the status of the addressed data. Similarly, an inverting amplifier 64 provides a visual indication of the status of the output of the accumulator by driving light emitting diode 66 through resistor 65. This display is quite useful in checking program operation in the single step mode with outputs disabled.

In addition to the normal data input and control, direct data input to the accumulator can also occur from nand gate 57 when serial data is present on the serial data in line and when the clock for serial data is actuated. This has the effect of resetting the accumulator when serial data is received. The clock signal for serial data is produced by nor gate 58 which has at its input a Q4 signal from the level shifter and an enable signal from the Q0 output of decoder 53, the Q0 output being activated when inputs A and B are both logical zeros corresponding to the machine language selection by the three operating bits 1, 2 and 3.

It may be noted that output Q0 of decoder 53 also controls the functioning of the machine instruction decoder 50 which is a one of eight addressable latch (such as Motorola CMOS 4099). This addressable register is addressed through address lines A0 through A2 which are connected to the inverted Q8–Q6 outputs of PROM 20. The data selected is chosen by the C input of circuit 60 which is controlled by the $\overline{Q6}$ output of the level shifter 25b. The function of this input is to select whether the data feeding circuit 50 comes from the accumulator (to thereby by a conditional instruction) or from the memory location (to thereby be an unconditional machine instruction). The memory location chosen is the $\overline{Q5}$ from level shifter 25b and the data input is the inverted accumulator output produced by inverting amplifier 64. Depending upon the binary code applied to the address inputs, the Q0–Q6 outputs of latch 50 find correspondence with some of the machine instructions set forth in Table 2.

Q0 of latch 50 corresponds to the EOS instruction by coupling the "1" bit from Q5 through circuit 60 to the data select line and then through the Q0 output and resistor 51 to activate the end of scan control of the start-up circuit 302. This occurs when all address lines are zero. The Q1 output of latch 50 serves to control the B input to decoder 70 which functions to select between the I/O addressing and the RAM addressing. The Q1 output also serves to connect to one input of exclusive or gate 87 which inverts the logic of the one bit bus since the random access memory uses inverted logic as compared to the I/O circuits. The one bit bus couples to the data input of the RAMS 32 and 33 by connection to the output of inverting amplifier 61. The Q2 and Q3 outputs of circuit 50 produce two address bits which are used by the card select decoder. One of these address bits is used directly by the address input A5 of each of the RAMs and the remaining address bit is used to select between RAM 32 and RAM 33.

Figure 8:
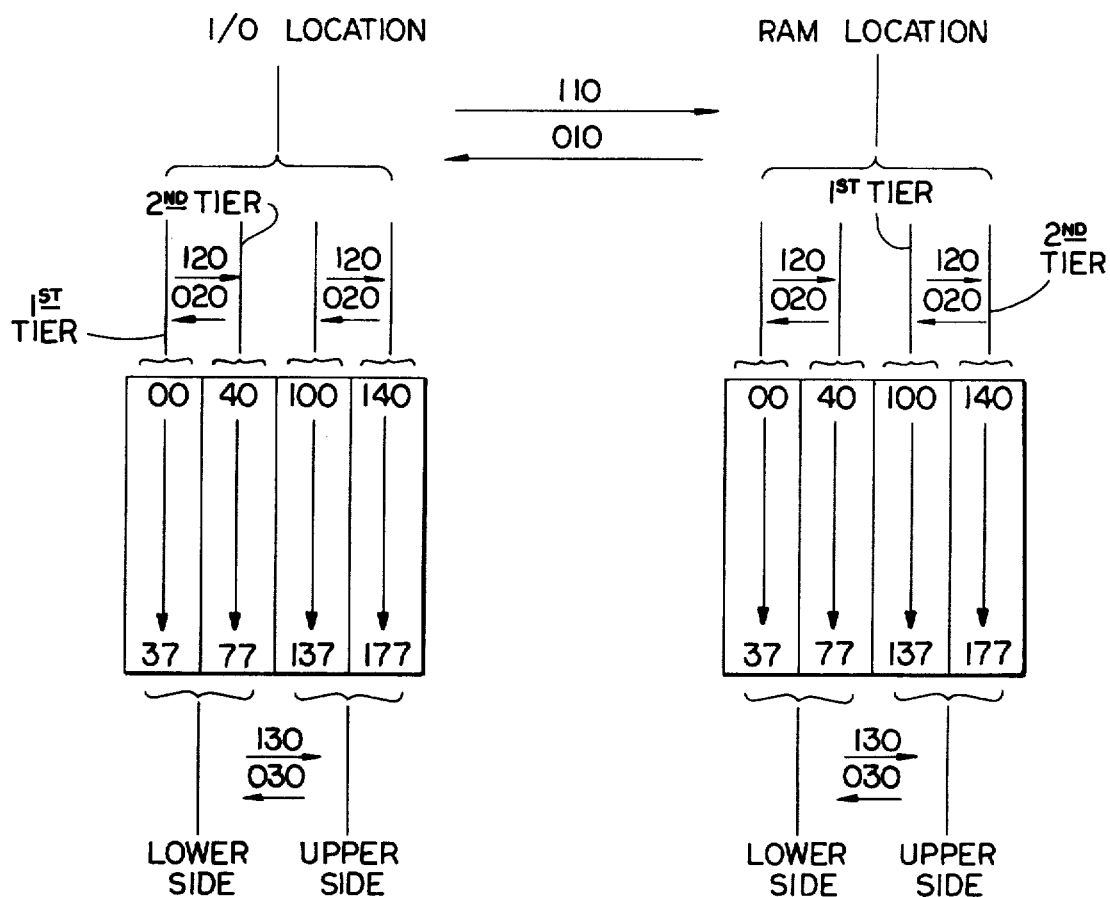
FIG. 8 discloses the arrangement of data locations and the means of addressing those data locations.

The selection of various address locations by the Q2 and Q3 outputs is diagrammatically set forth in FIG. 8. FIG. 8 shows the storage positions in both the I/O locations and RAM locations and illustrates that each of the locations is divided into two sides and each of the sides in divided into tiers. The numbers designating the changes between locations, sides and tiers are a three digit number representing the octal value of the address bits for the first two digits and the octal value of the operating bits for the last digit. The Q4 output of latch 50 is the first of the conditional machine instructions and results in performing the SDI machine instruction as set forth in Table 2 through the action of or gate 86. Output Q5 of latch 50 controls the SSI machine instruction by its connection to an input of nor gate 55. Q6 is the conditional end of scan instruction (CEOS) and accomplishes the functions set forth in Table 2 by the connection through resistor 52 to the start-up circuit 302. The Q1 output of decoding circuit 53 decodes the store instruction from the Q3 and Q2 bits applied at inputs A and B of decoding circuit 53. The decoding circuit is clocked by the clock output connecting to the input of nand gate 54 along with a Q1 bit from the level shifter. When the binary code is appropriate for a store instruction (see Table 1), the clock pulse enables the decoder output thereby producing a pulse at Q1 of latch 53. This pulse then passes through the nor gate 55 unless inhibited by the Q5 output of latch 50. This pulse is then applied to the A input of binary decoder 70 to cause a write signal at the output of Q1 of decoder 70 if the B input is addressing the I/O circuits or the Q3 output if RAM locations are being addressed.

It can be observed that the Q1 and Q2 bits connect directly to the gates driving the set and reset input of the accumulator latch. These two bits are directly read from the PROM 20 and control the and, or, and load function by the simple arrangement of the accumulator and without the need for special decoding circuitry. It may be also observed that the Q3 bit connects directly from the RAM to control the inverting or noninverting function of circuit 60. No decoding is necessary. The fact that the Q1, Q2 and Q3 bits can all be used directly with the circuitry without the use of decoding circuits to supplement their action greatly simplifies the design of this circuit. In a similar fashion, as is set forth in Table the "4" bit can be used to directly control the timer ...ice gated on by gate 58. Similarly, the "5" bit is useful for the data which directs the addressing of various storing positions. The "6" bit is used to control responses to machine instruction and is applied directly to the data selecting circuit 60 control input.

By assigning in an orderly fashion the machine instructions having corresponding binary data codes which are relevant to the machine instruction operation, the electronics associated with the logic controller can be substantially simplified. The careful selection of data bits to correspond to the machine instructions in the design of the disclosed preferred embodiment has enabled a substantial savings in circuitry.

Figure 9:
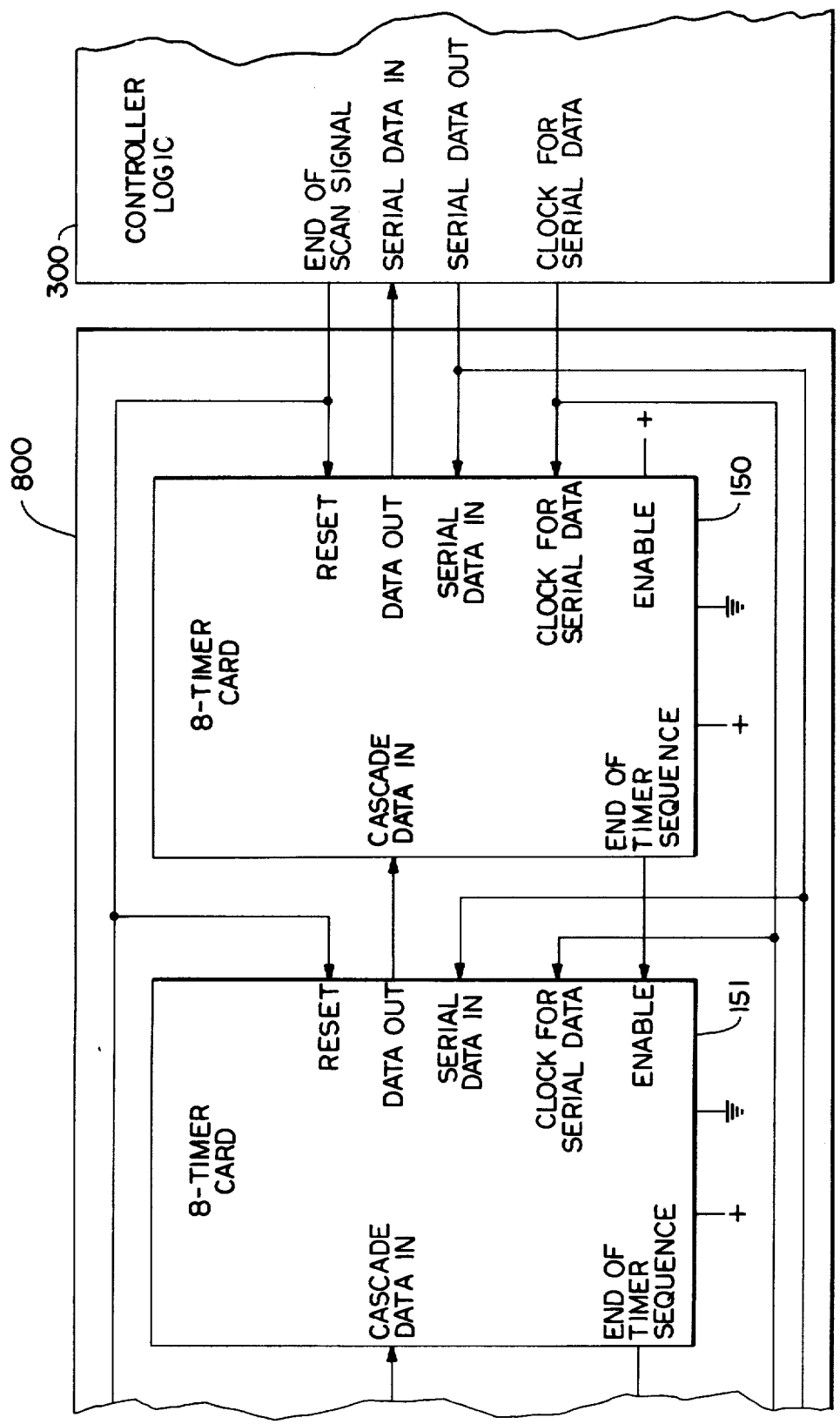
FIG. 9 is a block diagram of the timers of FIG. 1 showing how groups of timer cards may be cascaded to permit use of a large number of timers with the controller logic of the programmable logic controller.

Referring more particularly to FIG. 9 there is illustrated a portion of the controller logic 300 of FIG. 1 as it connects to a portion of the timers 800 of FIG. 1. Four lines connect the controller logic 300 to the timers 800. Within the timers 800 there are located, typically, four 8-timer cards connected in a cascaded fashion as shown by 8-timer cards 150 and 151. 8-timer card 150 is identical to all of the additional 8-timer cards which are used with the system and is designed so as to be connectable in a cascade fashion so that any number of 8-timer cards can be used. All of the cards have connected to them a common reset input, a common clock input for serial data, a common serial data input and common supply voltages. Each card has an enable input which permits the card to function and an end of timer sequence which connects to the enable input of the next adjacent card, if any, to enable it to function when the timer sequence of the eight card timer is finished. Data from cascaded cards such as card 151 is connected to a cascade data input in the previous card 150 and allowed to pass to the data out of card 150.

Figure 10:
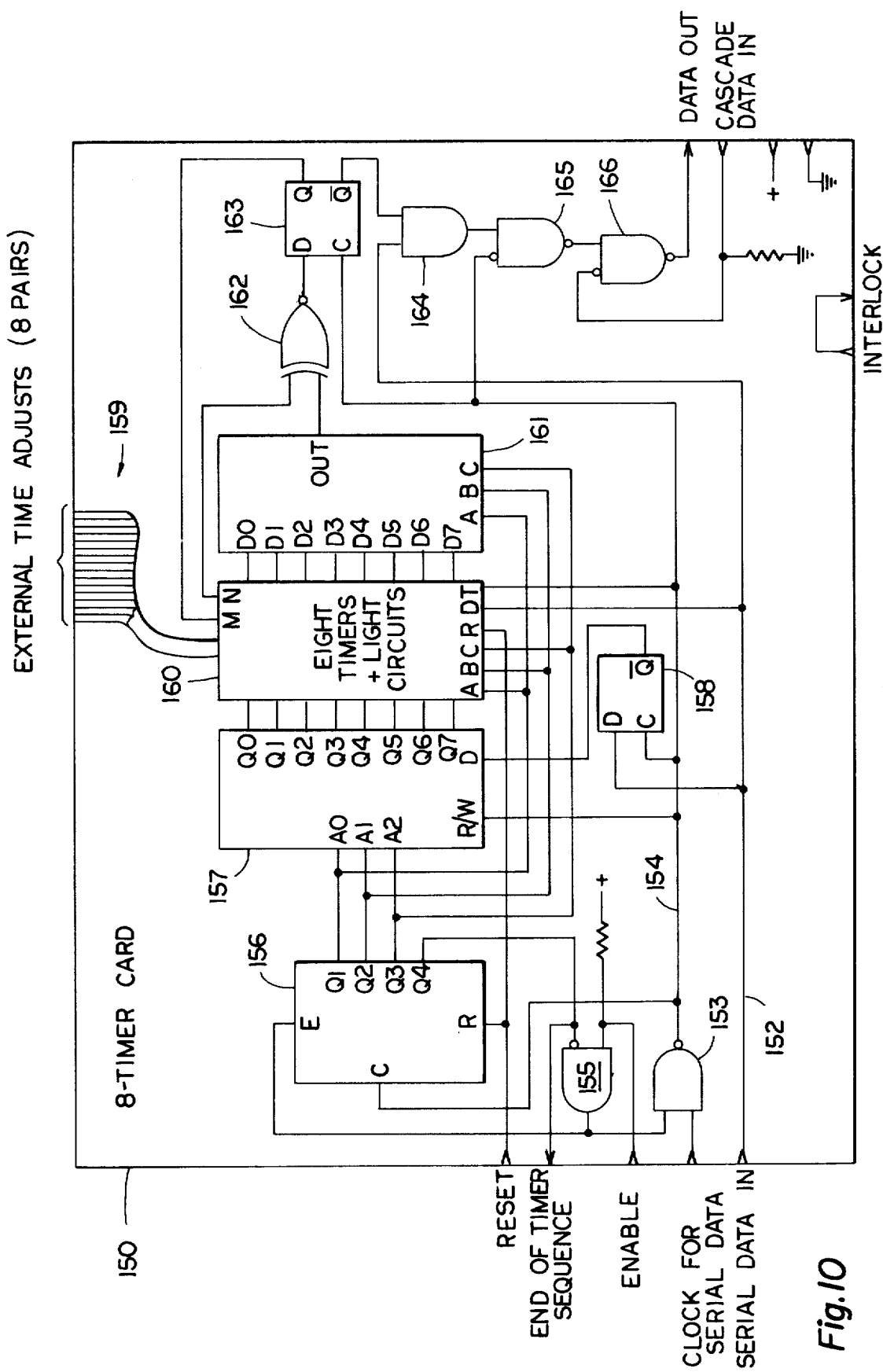
FIG. 10 is a circuit diagram of one of the 8-timer cards of FIG. 9.

The circuitry within an individual 8-timer card is shown more particularly in FIG. 10. The function of the 8-timer card is essentially to access timers each time a timing function is called for by the programmable controller logic. The serial data into the timer card 150 is applied to line 152 which serves as the data input for latch 158. Latch 158 is enabled by the internal clock signal on line 154 when nand gate 153 is gated to allow the clock for serial data to pass to its output. Nand gate 153 is turned off and binary counter 156 is disabled once the binary counter 156 reaches a full three bit count. Q4 then goes to a logic 1. When Q4 is at a logic 1, the timer card has cycled through all eight timers and the logic 1 from Q4 is applied to the end of timer sequence output which connects to enable inputs of successive cards. The reset input to the eight timer card causes the counter 156 to reset its count and this occurs once each time that the PROM 20 is read. It therefore occurs that each time the PROM 20 is scanned as many timers wil be sequentially accessed as there are timing instructions in the program. Depending upon the data on the serial data in line 152, latch 158 will provide a data signal representative of the state of the accumulator to the data input of the addressable latch 157 (Motorola CMOS 4099).

The eight outputs Q0–Q7 of the eight bit addressable latch 157 control the initiation of the timing of the eight timers in the eight timers and light circuit 160 described in more detail with reference to FIG. 11. The outputs of the eight timers and light circuits 160 indicate the state of the timer outputs and are demultiplexed by a demultiplexer 161 (such as Motorola CMOS 4051). Due to the functioning of the eight timers and light circuits, exclusive or gate 162 is controlled through a line from the N output of the eight timers and light circuits 160 to periodically invert the signal out in response to the periodic inversion of the signals to the data inputs of the demultiplexer 161. The periodic inversion is used to accomplish a light dimming effect on the indicating lights. The data output of exclusive nor gate 162 is latched by latch 163 and the inverted output is processed by comparison to the serial data in by and gate 164. A pulse generated from the internal clock pulse on line 154 is combined with the output of gate 164 by the gate 165. The output of gate 165 is then combined with any "cascade data in" signals by gate 166 to provide the data out signal.

Figure 11:
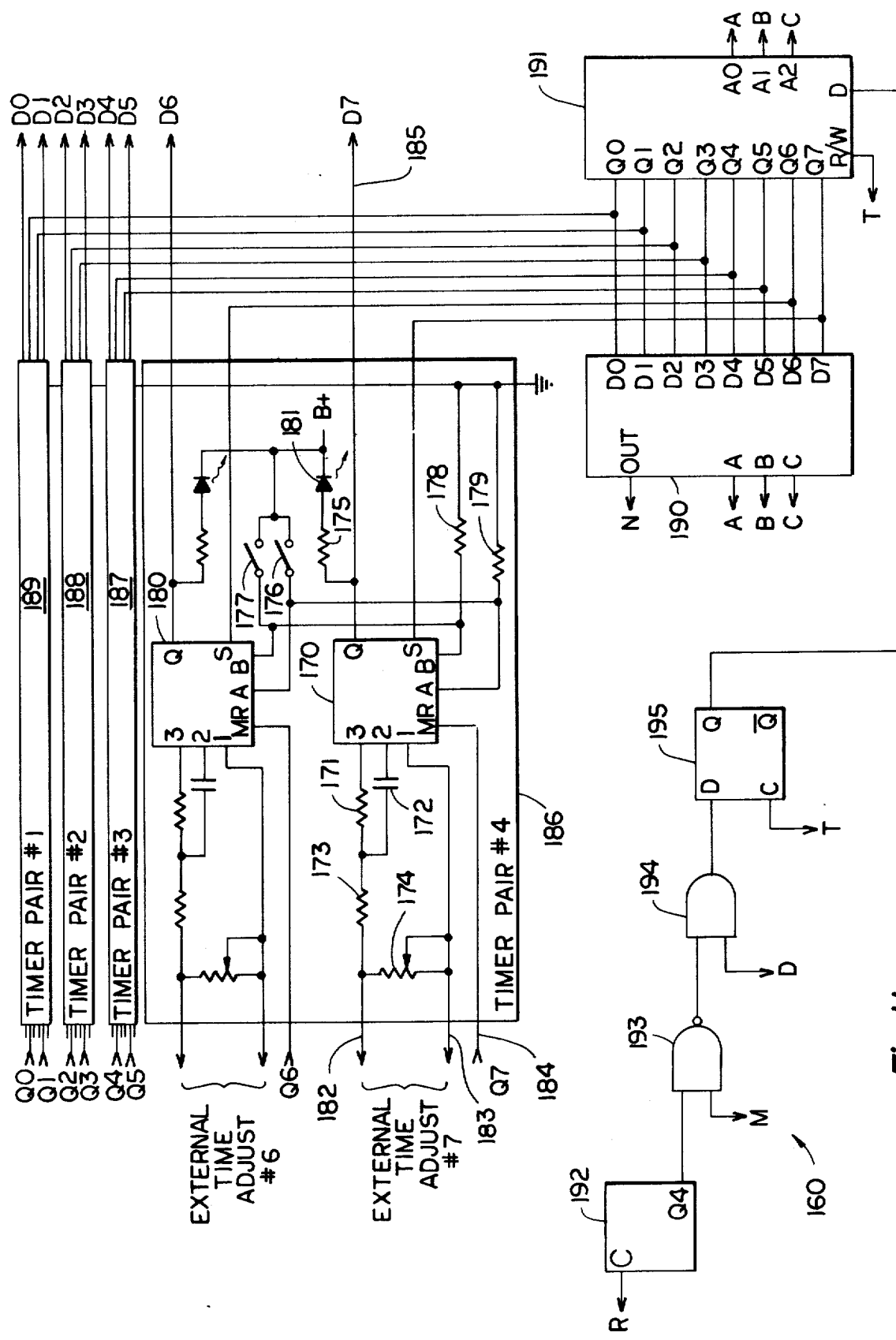
FIG. 11 is a circuit diagram of the "eight timers and light circuits" of FIG. 10.

Referring more particularly to FIG. 11 there is illustrated a timer pair 186 which is identical in configuration to timer pairs 187–189. The timer pairs incorporate standard integrated circuit timers 170 and 180 (Motorola CMOS 4541). These timers include an oscillator whose frequency is determined by externally connected capacitors such as capacitor 172 in series with a resistance which, as illustrated, comprises the resistor 173 and the adjustable value of readily accessible potentiometer 174. Alternatively, potentiometer 174 can be adjusted to its maximum resistance value and an external potentiometer can be connected across leads 182 and 183 which are a part of the group of external time adjusts leads 159 as shown in FIG. 10. The frequency of the oscillation is coupled through resistor 171 to the input of the counter integral with the timer 170. The counter counts the cycles of the oscillator by dividing it according to the programming on the A and B inputs. As shown in timer pair 186, two mechanical switches 176 and 177 are used to program the amount of division accomplished by the counter in the clock 170. Resistors 178 and 179 normally ground the inputs unless switches 176 and 177 are closed. Switches 176 and 177 are readily accessible dual in line package switches. In the preferred embodiment, these switches select maximum times of 1, 4, 16 or 256 seconds.

The output of timer 170 applies to the D7 input of demultiplexer 161. The state of the output is indicated by light emitting diode 181 which couples from B+ through resistor 185 to the Q output of the timer. The timer incorporates an S input which, when energized, inverts the Q output. The inversion of the Q output in accomplished to indicate a dimmed illumination of LED 181 to make it capable of three states of operation: off, bright and dim. The off state is appropriate for the condition where the timer has never been triggered. Demultiplexer 190 attaches to each of the S inputs of the respective timers such as timer 170 to demultiplex in accordance with the binary code on lines A, B and C thereby providing a signal at its output N which can be used by the exclusive nor gate 162 of FIG. 10 to reinvert back to normal any inverted outputs which are selected by demultiplexer 161. Those timer outputs which are chosen to be periodically inverted are selected by an eight bit addressable latch 191. The respective outputs Q0–Q7 of the addressable latch are addressed by lines A, B and C which connect to address input lines A0–A2. The addressable latch is caused to write by the clock signal connecting from line T as shown in FIG. 10.

The data signal is generated by a series of logic units 192-195. A binary coded decimal counter 192 has its clock input C connected to the R line which connectes to the reset signal from the controller logic 300. Counter 192 continuously counts reset signals and for two counts of ten producs a logic "1" at its Q4 output. This provides a 20% "on" duty cycle for the flashing LED's. Once gate 193 is enabled gate 194 functions to compare the data in with the data out of the timers by the respective connections to lines M and D (the connection to line M being inverted by the action of nand gate 193). The comparison is then stored in latch 195 by the action of the clock pulse from line T to the clock input of 195. The Q output of latch 195 connects to the data input of the addressable latch 191. The read/write input R/W connectes to line T which is the timer clock line. This circuitry causes flashing of LED's associated with timers that have finished timing but which are still receiving the data for initiating the timing interval. The continual and periodic inversion of the Q outputs of the timer 70 thereby causes the LEDS associated with the activated outputs to assume a dim appearance rather than a bright appearance. It can be observed that during the timing functions the LED such as LED 181 will be at full brilliance and that once the timer has reached its full count the light from the LED 181 will be dim and flashing.

While there have been described above the principles of this invention in connection with specific apparatus, it is to be clearly understood that this description is made onlyby way of example and not as a limitation to the scope of the invention.

What is claimed is:

1. A programmable logic controller comprising:
   (a) one bit output circuits having predetermined addresses;
   (b) one bit input circuits having predetermined addresses;
   (c) a one bit accumulator;
   (d) means for generating a succession of program statements in the form of multiple-bit binary logic; and
   (e) means for processing said program statements in succession to cause said output circuits to change state in response to the states of said accumulator, said output circuits and said input circuits and in response to said program statements, said processing means being operable upon a single statement at any given time and including
      (1) a random access memory having several locations, each of said locations being for storage of a bit of binary logic, and each of said locations having a selected address different from said addresses of said input or output circuits,
      (2) said processing means including means for addressing said locations in response to said program statements,
      (3) said random access memory being divided into both a retentive portion and a non-retentive portion, each including several locations, each location being for storage of a bit of binary logic,
      (4) means for automatically resetting, upon resumption of power to the controller after interruption, the memory in at least those locations in the non-retentive portions of the memory which were addressed in response to said program statements prior to said power interruption, and
      (5) memory holding means including a battery for supplying power to said retentive portion when power to the controller is interrupted, said power being sufficient to maintain the bit status of the memory in said retentive portion, said memory holding means thus preventing said means for automatically resetting from resetting locations in said retentive portion.

2. The controller of claim 1 in which said means for automatically resetting additionally includes means for setting the accumulator to a specific state an during initial processing of said program statements upon resumption of power to the controller after interruption.

3. The controller of claim 1 which additionally includes means for preventing operation of both said memory holding means and said automatic resetting means, said preventing means being operable at least only when power to the controller is interrupted.

4. The controller of claim 3 in which said preventing means includes a double pole push button switch.

5. A programmable logic controller comprising:
   (a) output circuits, each having a selected address;
   (b) input circuits, each having a selected address;
   (c) an accumulator for holding a single bit of binary data, said accumulator including a flip-flop circuit which can be set (causing the output to be put in a "1" state) and reset (causing the output to be put in a "0" state);
   (d) means, including a pulse producing clock, for generating a succession of program statements in the form of multiple-bit binary logic, said statements including a an operation portion containing at least two bits and an addressing portion;
   (e) means for processing said program statements in succession to cause said output circuits to change state in response to the states of said accumulator, said output circuits and said input circuits and in response to said program statements, said processing means being operable upon a single statement at any given time;
   (f) said means for processing including means for producing addressed data by addressing input and output circuits at a location which is in response to said addressing portion; and
   (g) said accumulator including a first gating means enabled directly by a first bit of said operation portion which enables addressed data to reset said flip-flop if the data is in a "0" state and a second gating means enabled directly by a second bit of said operation portion which enables addressed data to set said flip-flop if the data is in a "1" state whereby AND and OR functions between an output of the accumulator and the addressed data and load functions affiliated with the addressed data can be directly controlled by the two bits of the operation portion without the need for special decoding circuits.

6. The logic controller of claim 5 which includes an inverting amplifier between the data inputted into said first gating means and the data inputted into said second gating means.

7. The logic controller of claim 5 in which said first and second gating means each have an additional input which connects to said clock and is enabled thereby with each clock pulse.

8. The logic controller of claim 5 in which said operation portion has exactly three bits, and which logic controller includes means enabled by said third bit for inverting said addressed data inputted into said first and second gating means.

9. A programmable logic controller comprising:
(a) output circuits, each having a selected address;
(b) input circuits, each having a selected address;
(c) a one bit accumulator;
(d) means, which is resettable, for generating a succession of program statements in the form of binary logic,
(e) means for processing said program statements in succession to cause said output circuits to change state in response to the states of said accumulator, said output circuits and said input circuits and in response to said program statements, said processing means being operable upon a single statement at any given time and including means responsive to a specifically coded program statement for causing said means for generating to be reset back to the first program statement in its series if the data in said accumulator is in a first binary state and for allowing said means for generating to continue generating its succession of program statements if the data in said accumulator is in the second binary state.

10. The controller of claim 1 in which each of said timing circuits includes an LED to indicate the state of the timing circuit and an externally manually adjustable potentiometer to individually adjust the time of operation of said timing circuits.

11. The controller of claim 10 which additionally includes means for controlling the illumination of said LED in either an off state, a fully illuminated state or a dim state dependent upon the condition of the timing circuit input and output, to indicate the three states of:
(a) timing not yet begun,
(b) timing in process, and
(c) timing completed.

12. The controller of claim 1 which additionally includes a plurality of identical timing cards each including a plurality of said timing circuits, said cards being connected in cascade fashion and all of said timing circuits using only one timing circuit data input and one timing circuit data output.

13. A programmable logic controller comprising:
(a) output circuits, each having a selected address;
(b) input circuits, each having a selected address;
(c) means for generating a succession of program statements in the form of multiple-bit binary logic, said means for creating including means for creating an end of scan signal when the creation of one group of program segments has been completed and the progress is to begin again from the same initial program statement;
(d) an accumulator;
(e) means for processing said program statements in succession to cause said output circuits to change state in response to the states of said accumulator, said output circuits and said input circuits and in response to said program statements, said processing means being operable upon a single statement at any given time;
(f) a serial data source connected to a serial data input and having said end of scan signal connected to it;
(g) serial data input means separate from said input circuits and responsive to a specifically coded program statement for causing serial data from said serial data input to be applied to said accumulator and for providing a serial data enable signal to said serial data source each time the specific program statement occurs;
(h) a random access memory having several locations for storage of a bit of binary logic, each of said locations having a selected address different from said addresses of said input or output circuits; and
(i) said processing means including means for processing said program statements in succession to cause the bits in said locations to change state in response to the states of said accumulator, said output circuits and said input circuits and in response to said program statements.

14. The controller of claim 13 in which said accumulator includes a set/reset flip-flop and said serial data input means includes means for applying the serial data to the reset input of said flip-flop.

15. A programmable logic controller comprising:
(a) output circuits, each having a selected address;
(b) input circuits, each having a selected address;
(c) means for generating a succession of program statements in the form of binary logic;
(d) means for processing said program statements in succession, said processing means being operable upon a single statement at any given time;
(e) a plurality of groups of input and output interfacing circuits for said input circuits and output circuits providing electrical isolation between
(1) external terminals for to connection between conditional sensors and controllable devices and said input means and output means
(2) said means for processing,
said output interfacing circuits including latches, there being one latch associated with each output circuit;
(f) a common multi-bit bus for carrying at least four data bits connecting said processing means to each group of said input and output interfacing circuits;
(g) means for addressing any output circuit or input circuit through selection of one of said groups; and
(h) means for bidirectionally conveying data either to or from one of said output interfacing circuits of a selected group in parallel mode on said common multi-bit bus, said means for bidirectionally conveying using the same conductors for input as are used for output.

16. The logic controller of claim 15 which additionally includes:
(h) a plurality of sockets each having a plurality of connectors;
(i) a plurality of separate removable cards pluggable into said plurality of sockets;
(j) each group of said input and output interfacing circuits being on a separate removable card and having a corresponding connector wiring configuration
for each of said plurality of sockets to permit an input or output card to be operational when inserted in any of said plurality of sockets.

17. A programmable logic controller comprising:
(a) output circuits, each having a selected address;
(b) input circuits, each having a selected address;
(c) means for normally automatically generating a succession of program statements in the form of binary logic;
(d) an accumulator for holding a single bit of binary data;
(e) means for processing said program statements in succession to cause said output circuits to change state in response to the states of said accumulator and addressed data from said output circuits and said input circuits and in response to said program statements, said processing means being operable upon a single statement at any given time;
(f) first and second visual indicating means associated with each input and output circuit for separately indicating each of the states of the data from respective input and output circuits;
(g) third visual indicating means for indicating the state of said accumulator;
(h) a mode selector means including a manually operable switch for selecting between normal and single step mode of operation of the controller;
(i) means associated with said mode selector switch for disabling outputs from said controller when in said single step mode; and
(j) single step means including a manually operable switch for causing said automatically generating means generate only one of said program statements for each actuation of said switch when in said single step mode and for having no effect when in said normal mode.

18. The controller of claim 17 which additionally includes reset means including a manually operable reset switch for resetting said means for generating to its initial program statement, said reset means being operable only in the single step mode.

19. A programmable logic controller comprising:
(a) output circuits, each having a selected address;
(b) input circuits, each having a selected address;
(c) a serial data input;
(d) an accumulator for holding a single bit of binary data;
(e) means, including a pulse producing clock, for repetitively generating a succession of program statements in the form of multiple-bit binary logic in response to pulses produced by said clock, said means for generating including means for generating an end of scan signal when the generation of one group of program statements has been completed and the process is to begin again from an initial program statement;
(f) means for processing said program statements in succession to cause said output circuits to change state in response to the states of said accumulator, said output circuits and said input circuits and in response to said program statements, said processing means being operable upon a single statement at any given time;
(g) said means for processing also including means for applying the serial input to said accumulator in response to a specific program statement and for providing a serial data enable signal each time the specific program statement occurs;
(h) a plurality of timing circuits; and
(i) means for sequentially connecting, in a regular order, each of the outputs of said timing circuits to said serial input and each of the inputs of said timing circuits to said accumulator output in response to the serial data enable signal and for beginning the sequentially connecting at a specific timing circuit each time an end of scan signal occurs.

* * * * *

UNITED STATES PATENT AND TRADEMARK OFFICE
CERTIFICATE OF CORRECTION

PATENT NO. : 4,178,634
DATED : December 11, 1979
INVENTOR(S) : Peter G. Bartlett It is certified that error appears in the above-identified patent and that said Letters Patent is hereby corrected as shown below:

Under References Cited, change "3,959,634" to --3,959,636--.

Sheet No. 5 of the drawings, the symbol -- B+ -- should appear adjacent the free end of the resistor shown immediately left of flip-flop 22.

Sheet No. 10 of the drawings, delete the inverting circle on the right side of gate 162.

Column 2, line 30, change "but" to --bus--.

Column 3, line 65, change "it" to --is--.

Column 6, line 61, change "Line 4" to --Output 4 of decoder 264--.

Column 7, line 64, after the words "$\bar{Q}$ output", insert --of flip-flop 22--.

Column 7, line 67, change "$\bar{Q}$" to --Q--.

Column 8, line 64, change "outputs" to --output--.

Column 12, line 24, change "or" (first occurrence) to --of--.

Column 12, line 64, change "32" to --82--.

Column 13, line 6, change "and/or" to --and, or--.

Column 13, line 35, change "62" to --61--.

UNITED STATES PATENT AND TRADEMARK OFFICE
CERTIFICATE OF CORRECTION

PATENT NO. : 4,178,634
DATED : December 11, 1979
INVENTOR(S) : Peter G. Bartlett It is certified that error appears in the above-identified patent and that said Letters Patent is hereby corrected as shown below:

Column 13, line 68, change "by" to --be--.

Column 14, line 33, change "in" to --is--.

Column 14, line 40, change "or gate" to --nor gate--.

Column 15, line 58, change "wil" to --will--.

Column 16, line 11, change "nor gate" to --or gate--.

Column 16, line 48, change "185" to --175--.

Column 16, line 50, change "in" to --is--.

Column 17, line 21, change "70" to --170--.

Column 18, line 11, change "an during" to --during an--.

Column 18, line 32, delete the word "a".

Column 19, line 25, change "claim 1" to --claim 19--.

Column 19, line 38, change "claim 1" to --claim 19--.

Column 19, line 49, change "creating" to --generating--.

UNITED STATES PATENT AND TRADEMARK OFFICE
CERTIFICATE OF CORRECTION

PATENT NO. : 4,178,634

DATED : December 11, 1979

INVENTOR(S) : Peter G. Bartlett

It is certified that error appears in the above-identified patent and that said Letters Patent is hereby corrected as shown below:

Column 20, line 28, delete "for to" and change "connection" to --connected--.

Column 20, line 30, after "output means" insert --and--.

Column 21, line 20, after "means", insert --to--.

Signed and Sealed this

Fourteenth Day of August 1984

[SEAL]

Attest:

GERALD J. MOSSINGHOFF

Attesting Officer

Commissioner of Patents and Trademarks